B. S. LUNSFORD.
FARM GATE.
APPLICATION FILED AUG. 20, 1914.

1,133,246.

Patented Mar. 23, 1915.

WITNESSES:
F. Manneschmidt
C. A. Buchanan

INVENTOR
Blanton S Lunsford
BY
ATTORNEY

UNITED STATES PATENT OFFICE.

BLANTON S. LUNSFORD, OF COLUMBUS, GEORGIA, ASSIGNOR OF ONE-HALF TO G. W. ROBERTS, OF MUSCOGEE COUNTY, GEORGIA.

FARM-GATE.

1,133,246. Specification of Letters Patent. Patented Mar. 23, 1915.

Application filed August 20, 1914. Serial No. 857,625.

*To all whom it may concern:*

Be it known that I, BLANTON S. LUNSFORD, a citizen of the United States, residing at Columbus, in the county of Muscogee and State of Georgia, have invented a new and useful Farm-Gate, of which the following is a specification.

This invention relates to improvements in farm gates, and its primary object is to provide a gate which will be substantial, ornamental and cheap to construct, and can be opened and closed from either side of the fence by a person standing on the ground, or by a person in a vehicle with out dismounting. I attain this and other objects by the mechanism delineated in the accompanying drawing, which is the preferred form of my invention, and which forms a part of this specification and in which—

Figure 1:
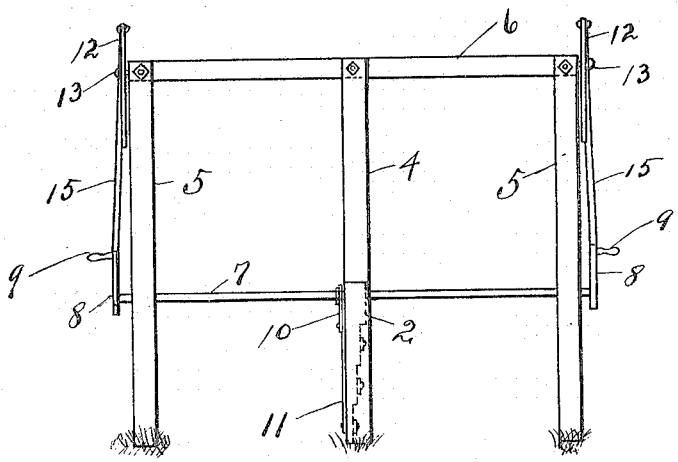
Figure 2:
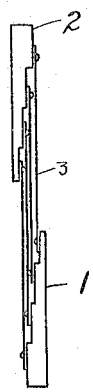
Figure 3:
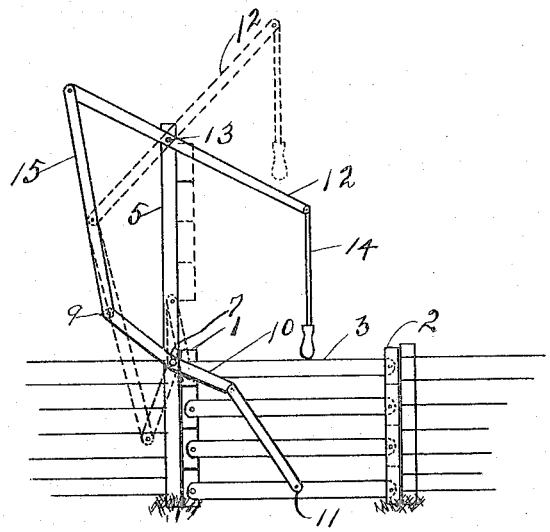

Figure 1 is a side elevation of the gate hoisting mechanism with the handles 14 left off to avoid obscuring the view; Fig. 2 is a detail view of the gate proper in a raised or open position to better show its construction; Fig. 3 is a side elevation of a gate with the hoisting mechanism assembled in accordance with my invention.

Referring more particularly to the drawings, similar reference characters refer to similar parts throughout the different views.

In constructing this gate I use posts 1 and 2, with one edge step shaped and the ends reversed as shown in Fig. 2, to accommodate the gate slats 3, so they will not interfere with each other when the gate is raised or opened. The gate posts 1 and 2, will require as many step depressions as there are slats 3, in the said gate. Gate post 1, is firmly attached to another post 4, which is high enough to clear the top end of post 2, when the gate is opened, and to which the wire or other fence material should be secured. At right angles to the line of fence I set other posts 5, of the same height as post 4, and tie all of the said posts together at their top ends with a transverse bar 6, and at a suitable point on the said posts, preferably near the top of the fence, I employ a transverse shaft 7, to which I apply crank arms 8, handles 9, and an arm 10, and the said arm 10 is connected to a link 11, which in turn is connected to the gate proper at a point determined by the length of the said arm 10 and link 11.

The gate opening levers 12, are fulcrumed at 13, and are provided with pendant handle rods 14, and are connected to the said levers 8 by connecting members 15, which makes a complete connection of all the hoisting and lowering mechanism to the gate proper which will enable one to open and close it from the ground, or from a vehicle on either side of the fence.

The dotted lines show the gate as it would appear opened.

Having thus described my invention what I claim as my own and desire to secure by Letters Patent is:

The combination with a pair of spaced posts, an intermediate post, a tilting and folding gate supported by said intermediate post, a rock shaft supported by said posts, and having a crank arm at each end provided with operating handles, an arm fixed to the shaft intermediate its ends, a link for connecting the arm to the gate, a lever pivotally connected intermediate its ends to each outer post, links connecting one of the ends of the levers to the crank arms respectively and operating means connected to the other ends of the levers.

In testimony that I claim the foregoing as my own, I have hereto affixed my signature in the presence of two witnesses.

BLANTON S. LUNSFORD.

Witnesses:
H. H. WARNER, Jr.,
W. F. McCAULEY.